United States Patent [19]

Sheu et al.

[11] Patent Number: 5,759,498
[45] Date of Patent: Jun. 2, 1998

[54] GAS EXHAUST APPARATUS

[75] Inventors: David Sheu, Hsinchu; Ling-Hsin Tseng, Hua Lien; Ka-Hing Wong, Tainan; D. Y. Sheu, Hsinchu, all of Taiwan

[73] Assignee: United Microelectronics Corp., Hsinchu, Taiwan

[21] Appl. No.: 764,908

[22] Filed: Dec. 12, 1996

[51] Int. Cl.$^6$ .................... F28G 1/08; F28G 1/16
[52] U.S. Cl. .................... 422/198; 422/168; 422/173; 422/178; 422/210; 165/95
[58] Field of Search .................... 422/168, 210, 422/174, 173, 178, 171, 198, 212; 165/95; 55/222; 95/227

[56] References Cited

U.S. PATENT DOCUMENTS 4,372,761  2/1983  Lindroos .................... 422/210
4,521,379  6/1985  Beane .................... 422/210
5,649,985  7/1997  Imamura .................... 55/222

FOREIGN PATENT DOCUMENTS 8911905  12/1989  WIPO.
9616720  6/1996  WIPO.

*Primary Examiner*—Hien Tran
*Attorney, Agent, or Firm*—McDermott, Will & Emery

[57] ABSTRACT

Improved gas exhaust apparatus of a semiconductor plant for substantially reducing the accumulation of solid substance on the surface of a gas exhaust system is disclosed. The apparatus includes a heating section for providing a thermal chamber, thereby transforming incoming gas and oxygen into solid substance. A barrier section is secured to an inner surface of the heating section for preventing the solid substance from accumulating on the inner surface of the heating section. A scrubbing section attached to the heating section is used to expel the solid substance out of the gas exhaust apparatus.

18 Claims, 2 Drawing Sheets

GAS EXHAUST APPARATUS

BACKGROUND OF THE INVENTION

1. Field of the Invention

The present invention relates to a gas exhaust system used in a semiconductor plant, and particularly to an improved gas exhaust system that substantially reduces the accumulated solid substance on the inner surface of the gas exhaust system.

2. Description of the Prior Art

FIG. 1 shows a sectional view of a conventional gas exhaust system used in a semiconductor plant. Incoming exhaust gas, such as silane, $PH_3$, $B_2H_6$ or $N_2$, is reacted with oxygen inside a heater 10, and is transformed into solid substance such as silicon dioxide. This solid substance is then expelled and processed by a cooling/scrubbing subsystem 12 to condense the solid substance into a condensed liquid, which is then drained away the gas exhaust system. Some unreacted exhaust gas and uncondensed solid substance are usually further reduced by a secondary cooling/scrubbing subsystem (not shown in the figure).

Unfortunately, some aforementioned solid substances are accumulated on the inner surface of the heater 10 near the interconnection with the cooling/scrubbing subsystem 12. A spiral-shape blade 14 is usually used inside the heater 10 to scrape the accumulated solid substance. This spiral-shape blade 14 is controlled automatically by a rod 16 connected to one end of the blade 14 and extended through the cooling/scrubbina section 12. The blade 14 moves back and forth periodically. However, the accumulated solid substance on the inner surface of the heater is inevitable after this gas exhaust system is used for a few months. A disconnection of the heater 10 from the other portion of the exhaust system is then required, and hard work by hand is the only way to scrape that accumulated substance away. The interruptions of the manufacture by this disconnection and scrape not only consume manpower but also reduce the throughput. A need has been arisen to reduce the accumulation on the surface of a gas exhaust system.

SUMMARY OF THE INVENTION

In accordance with the present invention, improved gas exhaust apparatus is provided for substantially reducing the accumulation of solid substance on the surface of a gas exhaust system. In one embodiment, exhaust gas, such as silane, $PH_3$, $B_2H_6$ or $N_2$, is transported into an oxygenator section, where the exhaust gas is mixed with oxygen for ease of reaction in a consequent processing step. A heater is connected to the output port of the oxygenator, where the mixed exhaust gas and oxygen are reacted and transformed into some solid substances such as silicon dioxide. A thermocouple connected to the heater is used to detect and control the temperature of the reaction chamber.

A water spray nozzle is inserted near the bottom of the reaction chamber to spray water or deionized water into the reaction chamber, thereby condensing the reacted solid substance in this water spray. A metal cylinder having two open ends is secured to the heater and a cooling/scrubbing section by a securing ring. This securing ring is firmly secured between the heater and the cooling/scrubbing section, for example, by screws. The metal cylinder acts as a barrier to prevent the reacted solid substance from accumulating on the inner surface of the chamber. A cleaning mechanism such as a spiral-shape blade is optionally used inside the chamber to scrape any accumulated solid substance on the surface of the metal cylinder.

The cooling/scrubbing section is then attached to the heater to expel the condensed liquid via a liquid drain. One or more supplemental cooling/scrubbing sections are further connected to the primary cooling/scrubbing section to further process some solid substance or the exhaust gas that is not completely processed by the primary cooling/scrubbing section.

DESCRIPTION OF THE PREFERRED EMBODIMENT

Figure 1:
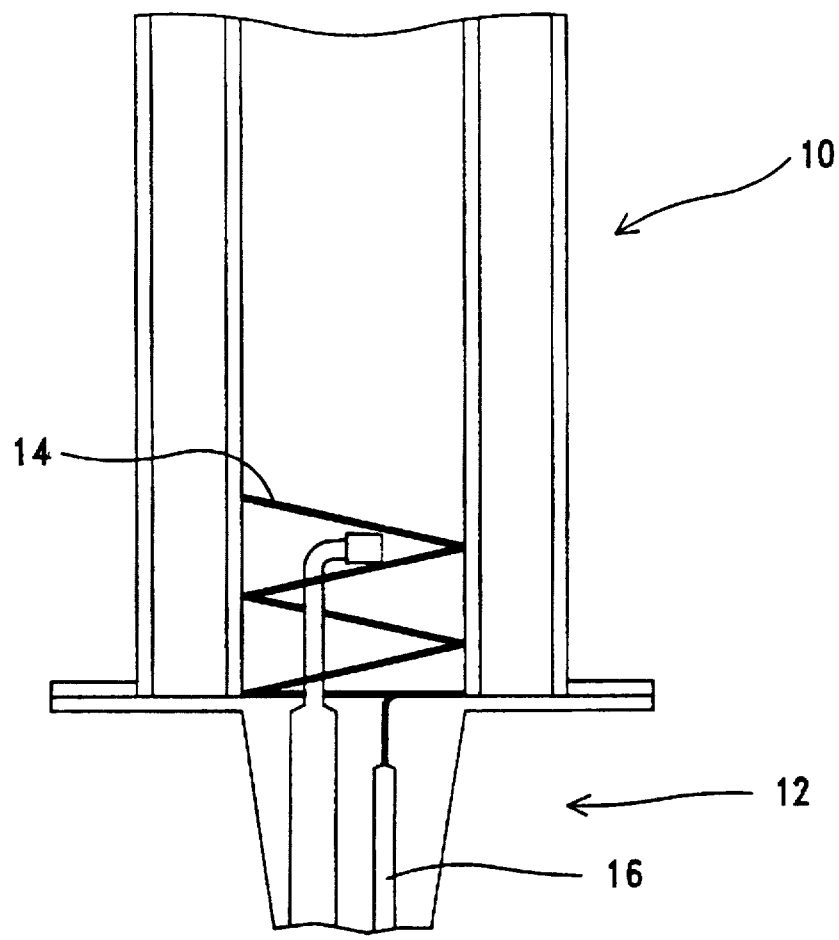
FIG. 1 shows a sectional view of a conventional gas exhaust system used in a semiconductor plant.
Figure 2:
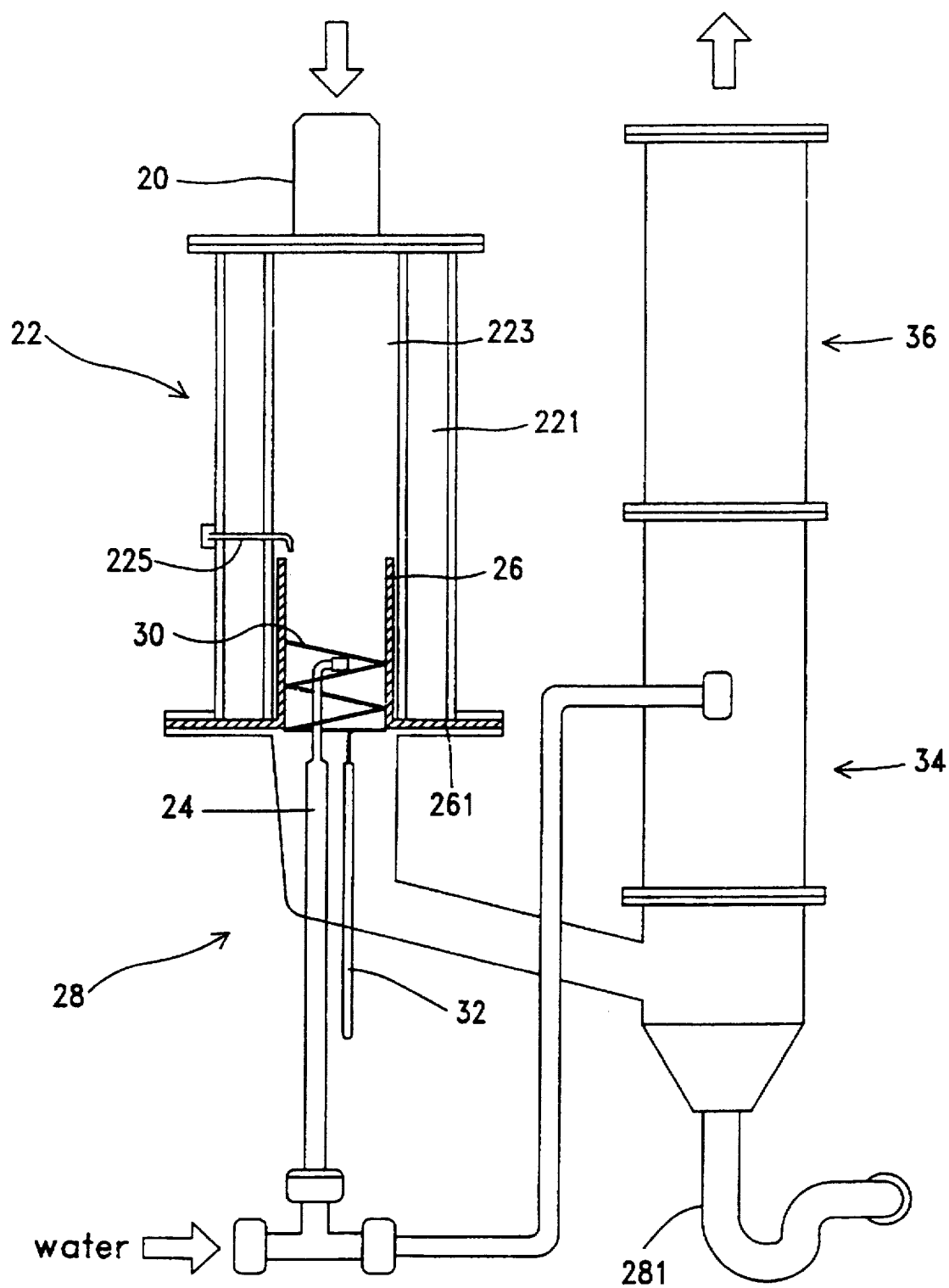
FIG. 2 shows a sectional view of one embodiment of the present invention.

FIG. 2 shows one embodiment of the present invention. Exhaust gas, such as silane, $PH_3$, $B_2H_6$ or $N_2$, is transported into an oxygenator section 20, where the exhaust gas is mixed with oxygen for ease of reaction in a consequent processing step. Connecting to the output port of the oxygenator 20 is a heater 22, where the mixed exhaust gas and oxygen are reacted and transformed into some solid substances such as silicon dioxide. The thermal environment of thermal chamber is provided by a heater element 221 surrounding the inner chamber 223 of the heater 22. A thermocouple 225 is connected to the heater 22 and is used to detect and control the temperature of the reaction chamber 223.

A water spray nozzle 24 is inserted near the bottom of the reaction chamber 223 to spray water or deionized water into the reaction chamber 223. The reacted solid substance is then condensed in this water spray into a condensed liquid.

A metal cylinder 26 having two open ends is secured to the heater 22 and a cooling/scrubbing section 28 by a securing ring 261. The inner diameter of this securing ring 261 is about the same or less than the diameter of the reaction chamber 223, and the outer diameter of the securing ring 261 is equal to or less than the outer diameter of the heater 22. The securing ring 261 is firmly secured between the heater 22 and the cooling/scrubbing section 28, for example by screws. The aforementioned metal cylinder 26 acts as a barrier to prevent the reacted solid substance from accumulating on the inner surface of the chamber 223. The metal cylinder 26 can be made of stainless steal or other metallic material, which can prevent the accumulation of the solid substance. Moreover, this metal cylinder can be replaced quickly without interrupting the procedure of the manufacture.

A cleaning mechanism such as a spiral-shape blade 30 is optionally used inside the chamber 30 to scrape any accumulated solid substance on the surface of the metal cylinder 26. The spiral-shape blade 30 is controlled by a rod 32 connected to one end of the blade 30 and extended through the cooling/scrubbing section 28. The blade 30 moves back and forth periodically.

The cooling/scrubbing section 28 mentioned above is attached to the heater 22 to expel the condensed liquid via a liquid drain 281. One or more supplemental cooling/scrubbing sections are further connected to the primary cooling/scrubbing section 28 to process some solid substance or the exhaust gas that is not completely processed by the primary cooling/scrubbing section 28. In this embodiment, a lower secondary cooling/scrubbing section 34 and an upper cooling/scrubbing section 36 are used to condition the unreacted gas or substance. In the lower secondary cooling/scrubbing section 34, the unreacted gas or substance is absorbed by a filter and is condensed again by water spraying. In the upper cooling/scrubbing section 36, the unreacted gas or substance is filtered again, and is finally exhausted out of the gas exhaust system.

Although specific embodiments have been illustrated and described, it will be obvious to those skilled in the art that various modifications may be made without departing from the spirit which is intended to be limited solely by the appended claims.

What is claimed is:

1. Improved gas exhaust apparatus, comprising: a thermal chamber wherein incoming gas reacts with oxygen to be transformed into a solid substance;

barrier means firmly secured to an inner surface of said thermal chamber for preventing said solid substance from accumulating on the inner surface of said thermal chamber; and scrubbing means attached to said thermal chamber for expelling said solid substance.

2. The apparatus according to claim 1, further comprising oxygenator means attached to an input port of said thermal chamber for transporting the incoming gas and the oxygen, said incoming gas and said oxygen being mixed inside said oxygenator means.

3. The apparatus according to claim 1, further comprising at least one heater element surrounding said thermal chamber to provide a thermal environment for the incoming gas and the oxygen.

4. The apparatus according to claim 3, further comprising a thermocouple connected to said thermal chamber to control temperature therein.

5. The apparatus according to claim 1, further comprising water spray means secured to said thermal chamber for providing water spray to condense the solid substance into a condensed liquid.

6. The apparatus according to claim 5, further comprising a liquid drain connected to said scrubbing means for draining the condense liquid.

7. The apparatus according to claim 1, further comprising cleaning means located in said thermal chamber for cleaning accumulated solid substance on a surface of said barrier means.

8. The apparatus according to claim 7, wherein said cleaning means comprises at least a blade to scrape the accumulated solid substance.

9. The apparatus according to claim 1, further comprising supplemental means connected to said scrubbing means for further processing the solid substance and the incoming gas not processed completely by said scrubbing means.

10. The apparatus according to claim 1, wherein said barrier means comprises:

a metal cylinder with two ends open; and a securing ring having an inner diameter and an outer diameter, wherein said inner diameter is less than the diameter of said thermal chamber, and said securing ring is firmly secured between said thermal chamber and said scrubbing means.

11. An improved gas exhaust apparatus, comprising:

a thermal chamber wherein incoming gas reacts with oxygen to be transformed into a solid substance;

water spray means, secured to said thermal chamber, for providing water spray to condense the solid substance into a condensed liquid;

barrier means firmly secured to an inner surface of said thermal chamber for preventing said solid substance from accumulating on the inner surface of said thermal chamber, wherein said barrier means comprises:

a metal cylinder with two ends open; and a securing ring having an inner diameter and an outer diameter, wherein said inner diameter is less than the diameter of said thermal chamber, and said securing ring is secured to said thermal chamber; and scrubbing means attached to said thermal chamber for expelling said solid substance.

12. The apparatus according to claim 11, further comprising oxygenator means attached to an input port of said thermal chamber for transporting the incoming gas and the oxygen, said incoming gas and said oxygen being mixed inside said oxygenator means.

13. The apparatus according to claim 11, further comprising at least one heater element surrounding said thermal chamber to provide thermal environment for the incoming gas and the oxygen.

14. The apparatus according to claim 13, further comprising a thermocouple connected to said thermal chamber to control temperature therein.

15. The apparatus according to claim 11, further comprising a liquid drain connected to said scrubbing means for draining the condense liquid.

16. The apparatus according to claim 11, further comprising cleaning means located in said thermal chamber for cleaning accumulated solid substance on a surface of said barrier means.

17. The apparatus according to claim 16, wherein said cleaning means comprises at least a blade to scrape the accumulated solid substance.

18. The apparatus according to claim 11, further comprising supplemental means connected to said scrubbing means for further processing the solid substance and the incoming gas not processed completely by said scrubbing means.

* * * * *